3,655,866
SUGARLESS GUM CONTAINING DICALCIUM PHOSPHATE DIHYDRATE
Anthony G. Bilotti, Queens Village, N.Y., assignor to Warner-Lambert Company, Morris Plains, N.J.
No Drawing. Filed Jan. 26, 1970, Ser. No. 5,967
Int. Cl. A61k 27/00
U.S. Cl. 424—48                                                   4 Claims

ABSTRACT OF THE DISCLOSURE

A sugarless gum containing a freely releasable form of dicalcium phosphate dihydrate is prepared by coating or agglomerating dicalcium phosphate dihydrate powder with a water-soluble polyol or combination of polyols, such as mannitol, sorbitol, xylitol, or arabitol, prior to incorporation into the gum composition. About 0.5 to 18 parts by weight of the polyol ingredient is mixed with 1 part by weight of dicalcium phosphate dihydrate powder and a small amount of water is added; the agglomerate formed is dried, pulverized and incorporated into a sugarless gum composition prepared from gum base, sorbitol solution, sorbitol, mannitol, artificial sweeteners, and flavoring agents. This chewing gum product provides a method for reducing the incidence of dental caries since therapeutically beneficial quantities of dicalcium phosphate dihydrate are freely released into the oral cavity and brought into contact with the dental enamel upon chewing of the gum.

BACKGROUND OF THE INVENTION

Consumption of sugar-containing confectionaries has been consistently discouraged by the dental profession as a result of numerous studies reporting that such confectionaries constitute a chief cause of dental caries.

One approach to the problem of inhibiting dental caries has been to incorporate various chemically active ingredients into vehicles which will come into contact with the teeth, such as dental preparations, lozenges or chewing gums, in order to counteract the effects of any sugar products taken into the oral cavity. Some prior art methods have been disclosed for the incorporation of active or insoluble ingredients into sugar containing gum bases: U.S. 3,075,884 teaches a method for obtaining the release of solid active ingredients from a gum base by dispersing the solid active ingredient throughout the corn syrup ingredient of the gum prior to the admixture of the corn syrup with the gum base; U.S. 3,011,949 teaches a method for incorporating active ingredients, including phosphates, into slab chewing gum, by coating the active ingredients with wet sugar.

However, for sugarless gum formulations, no prior art methods exist describing the incorporation of an additive such as dicalcium phosphate dihydrate into the gum formulation so as to yield substantial release of the additive into the oral cavity upon chewing of the gum, while still maintaining the flavor, consistency, and storage stability necessary for consumer acceptance of the gum product.

U.S. 3,352,689 does disclose the formulation of a sugarless gum prepared from gum base, gum-acacia-in-water, gum acacia powder, sorbitol, mannitol, sweeteners and flavoring agents, which may contain additional active ingredients such as phosphates; however, no statement is made concerning the form in which these active ingredients must be or the manner for incorporating these active ingredients into the sugarless gum formulation so as to insure the release of effective amounts of the active ingredients into the oral cavity.

It is the object of this invention to provide a sugarless gum composition containing freely releasable dicalcium phosphate dihydrate. It is another object of this invention to prepare a sugarless gum composition containing freely releasable dicalcium phosphate dihydrate in sufficient quantities to insure that therapeutically beneficial amounts of this additive will be brought into contact with the dental enamel upon chewing of the gum. It is a further object of this invention to provide a novel process for incorporating the dicalcium phosphate dihydrate into a particular sugarless gum formulation so as to obtain release of the dicalcium phosphate dihydrate into the oral cavity upon chewing of the gum. These and other objects of the invention will be apparent from the following detailed description.

SUMMARY OF THE INVENTION

Dicalcium phosphate dihydrate is coated or agglomerated with a water-soluble polyol or combination of polyols such as mannitol, sorbitol, xylitol, and arabitol, prior to incorporation into a sugarless gum formulation prepared from gum base, sorbitol solution, sorbitol, mannitol, artificial sweeteners, and flavoring agents. The agglomerate is prepared by mixing 0.5 to 18 parts by weight of granules of the polyol ingredient with one part by weight of dicalcium phosphate dihydrate powder and adding water. The mixture is dried, pulverized, and added to the sugarless gum formulation, to provide a product which releases dicalcium phosphate dihydrate into the oral cavity upon chewing of the gum.

DESCRIPTION OF THE INVENTION

It has now been found that dicalcium phosphate dihydrate can be incorporated into a sugarless gum formulation containing gum base, sorbitol solution, sorbitol, mannitol, artificial sweeteners, and flavoring agents so that it is freely released upon chewing and brought into contact with the teeth, by coating or agglomerating dicalcium phosphate dihydrate powder with a water-soluble polyol or combination of polyols in granular form, prior to incorporation into the sugarless gum formulation. Suitable water-soluble polyols include mannitol, sorbitol, xylitol, and arabitol, or combinations thereof. Among these, mannitol is preferred. From 0.5 to 18 parts by weight of a water-soluble polyol or a combination of water-soluble polyols, is mixed with one part by weight of dicalcium phosphate dihydrate powder, and water is added in small portions until the mixture has a bread or dough-like consistency. The polyol and water present form a solution which surrounds or coats the smaller particles of the insoluble dicalcium phosphate dihydrate powder; this material is spread on trays and dried, forming an agglomerated product. Techniques employed in forming the agglomerated product are commonly called "granulation" in tableting operations. Subsequent milling or pulverizing of the agglomerated product produces particles of a size so that no more than 25% by weight of the particles remains on a 100 mesh screen. It is preferred that the bulk of the particles be between 100 and 270 mesh in size.

The polyol agglomerated product of this invention may also be prepared by a spray drying technique. In this procedure, from 0.5 to 18 parts by weight of the water-soluble polyol or combination of polyols, is dissolved in an excess of water. One part of dicalcium phosphate dihydrate is suspended in the solution and the resultant suspension is sprayed into a large cone and dehydrated by a current of warmed, dry air circulating in the cone. The dry powder consisting of dicalcium phosphate dihydrate agglomerated with the polyol or combination of polyols is ermoved from the bottom of the cone. A variety of commercial spray dryers may be used for this process.

In the preferred product of the invention an agglomerate prepared from 0.5 to 6.7 parts by weight of the water-soluble polyol or combination of water-soluble polyols, in granular form, and one part by weight of dicalcium phosphate dihydrate powder is incorporated into a sugarless gum. The most preferred product of the invention contains an agglomerate prepared from 2.7 parts by weight of mannitol per part by weight of dicalcium phosphate dihydrate powder.

The polyol or combination of polyols, when agglomerated with the dicalcium phosphate dihydrate powder in the abovedescribed manner, and incorporated into a sugarless gum formulation, in an amount of from 10 to 40% by weight, based on the weight of the total formulation, unexpectedly operates to release effective quantities of dicalcium phosphate dihydrate from the sugarless gum base. In the preferred products of this invention, the agglomerate is incorporated into the sugarless gum formulation in an amount of 20% to 35% by weight, most preferably, 28% by weight, based on the total weight of the formulation.

The sugarless gum formulation into which the polyol-agglomerated dicalcium phosphate dihydrate is incorporated is prepared from the following ingredients (expressed in percent by weight): gum base—15% to 40%; sorbitol solution—3% to 20%; sorbitol—5% to 50%; mannitol—2% to 30%; and artificial sweetener and flavor—0.5% to 2.5%. In the more preferred products, the following amounts are used: gum base—18% to 30%; sorbitol solution—5% to 10%; sorbitol—25% to 35%; mannitol—2% to 5%; and artificial sweetener and flavor—0.5% to 1.5%.

The chewing gum base used is generally prepared by heating and blending various ingredients such as natural gums, synthetic resins, waxes, fillers, etc., as is well known in the art. Typical examples of such materials may be found in Vol. 30 of the U.S. Federal Register, No. 247, Sec. 121.1059, dated Dec. 23, 1965.

The sorbitol solution listed above is suitable for use when prepared at a concentration of from about 10% to about 80%, preferably from 60% to about 75% by weight of d-sorbitol in water. A particularly preferred product, a solution of about 70% by weight of d-sorbitol in water, is marketed by Atlas Chemical Industries, Wilmington, Del., under the trade name Sorbo 70% Solution. This product has been found to aid in binding other ingredients, particularly sweetening agents, to the gum base.

As the artificial sweetener, saccharin and saccharin salts are suitable. Additional flavoring oils, which may be used to provide a distinctive or pleasing flavor for the sugarless gum include all conventional edible, i.e. nontoxic, natural, essential and synthetic flavoring oils.

A particularly preferred product contains 28% by weight gum base, 9% by weight Sorbo 70% Solution, 31% by weight sorbitol, 28% by weight mannitol agglomerated dicalcium phosphate dihydrate containing about 2.7 parts by weight of mannitol per each part by weight of dicalcium phosphate dihydrate, a further amount of about 3% by weight mannitol, about 1% by weight artificial sweetener and flavoring agent, based on the weight of the entire formulation.

In formulating the sugarless gum containing the freely-releasable dicalcium phosphate dihydrate, the following sequence of addition and blending of ingredients is used to insure optimum quality in the final product. The polyol-agglomerated dicalcium dihydrate is prepared separately, according to one of the previously described methods. The gum base, sorbitol solution, and artificial sweetening agent are added to a gum mixing kettle. These ingredients are mixed until a homogeneous mass is obtained. The sorbitol (crystalline) is added to the kettle and all ingredients are further mixed. The polyol-agglomerated dicalcium phosphate dihydrate is added and all ingredients are again homogeneously blended. At this point, the mannitol (granular) and flavoring agent are added and all ingredients are mixed until a uniform mixture results. The total mixing time for all mixes is about 15–17 minutes. After mixing is completed the bulk formulation is ready for further processing into the desired gum slabs.

The following examples are included to further illustrate the practice of the present invention:

EXAMPLE 1

Preparation of mannitol-agglomerated dicalcium phosphate dihydrate 73 grams of mannitol granules are dissolved in 500 ml. of water and 27 grams of dicalcium phosphate dihydrate powder is dispersed in the resultant solution. The suspension is sprayed into the cone of a small spray dryer and dehydrated by a current of warmed, dry air circulating in the cone. The dry powder consisting of dicalcium phosphate dihydrate and mannitol is removed from the bottom of the cone. The agglomerated product is screened to remove any large flakes. The finished product is collected and checked for particle size. No more than 25% of the material should remain on a 100 mesh screen.

EXAMPLE 2

Preparation of sorbitol-agglomerated dicalcium phosphate dihydrate 50 grams of sorbitol crystals are dissolved in 400 ml. of water and 50 grams of dicalcium phosphate dihydrate powder is dispersed in the resultant solution. The spray drying technique and further processing of Example 1 are followed to obtain the agglomerated product.

EXAMPLE 3

Preparation of mannitol/sorbitol-agglomerated dicalcium phosphate dihydrate 40 grams of mannitol granules, 30 grams of sorbitol crystals are dissolved in 500 ml. of water, and 30 grams of dicalcium phosphate dihydrate powder is dispersed in the resultant solution. The spray drying technique and further processing of Example 1 are followed to obtain the agglomerated product.

EXAMPLE 4

Preparation of the sugarless gum containing mannitol-agglomerated dicalcium phosphate dihydrate 28 grams of gum base, 9 grams Sorbo 70% solution, and 0.26 gram of a 37% sodium saccharin solution are added to a gum mixing kettle. The agitators are started and the ingredients are mixed in reverse for two minutes and then mixed with a forward motion for two minutes. 31 grams of sorbitol are added and all ingredients are mixed with a forward motion for two minutes. 28 grams of the mannitol-agglomerated dicalcium phosphate (prepared according to the procedure in Example 1 above) are added and all ingredients are forward mixed for another three minutes. The final ingredients, 3 grams of mannitol and 1.0 gram of natural and/or synthetic flavor are added and all ingredients are forward mixed for approximately three-and-a-half minutes, then reverse mixed for approximately one-half minute. The mixing is stopped and the sides of the kettle are scraped down. The agitators are again started, and the mixture is again forward mixed for approximately three minutes. The gum product is then unloaded from the kettle, rolled, scored, conditioned, and wrapped.

EXAMPLE 5

Sugarless gum formulation containing mannitol/sorbitol-agglomerated dicalcium phosphate dihydrate The procedure of Example 4 is followed except that the mannitol-agglomerated dicalcium phosphate dihydrate ingredient of Example 4 is replaced with the mannitol/sorbitol-agglomerated dicalcium phosphate dihydrate of Example 3.

To illustrate the advantage of the product of our invention, the following tests were run: a sugarless gum product containing mannitol-agglomerated dicalcium phosphate dihydrate was made, following the procedures of Examples 1 and 4; a second sugarless gum product was made following the procedure described in Example 4 except that an equivalent amount of unagglomerated dicalcium phosphate dihydrate and mannitol were added, in place of the mannitol-agglomerated ingredient.

Samples of each of the above chewing gum products were analyzed to determine the amount of dicalcium phosphate dihydrate actually present in a representative sample. To determine release, each product was chewed for 30 minutes; each sample was then analyzed to determine the amount of dicalcium phosphate dihydrate remaining in the gum bolus. Percentages of dicalcium phosphate dihydrate released into the oral cavity by chewing were calculated from these figures. The chewing was performed by a panel of four subjects. In every case, the same subject chewed both types of gum, so that a true comparison of the releases from both types of gum could be obtained. The following results were obtained:

AVERAGE DICALCIUM PHOSPHATE DIHYDRATE RELEASED
[Percent by weight]

| Subjects | 1 | 2 | 3 | 4 |
|---|---|---|---|---|
| Unagglomerated DCP, percent | 22.68 | 37.01 | 31.54 | 24.30 |
| Mannitol-aggolmerated DCP, percent | 47.02 | 56.27 | 49.34 | 41.09 |

These results indicate that the release of mannitol-agglomerated dicalcium phosphate dihydrate from the sugarless gum product of this invention is from 1.52 to 2.1 times greater than the release of the unagglomerated dicalcium phosphate dihydrate.

Dicalcium phosphate dihydrate is known to inhibit the formation of caries, particularly when brought into contact with the teeth using a vehicle such as a sugar containing chewing gum. However, the use of a sugarless gum vehicle for the same purpose offers the advantage of not supplying sugar to the oral cavity at the same time the caries inhibiting agent is released. By use of the particular gum formulation of this invention, release of incorpoarted dicalcium phosphate dihydrate is improved to the extent that effective quantities of dicalcium phosphate dihydrate are released into the oral cavity. Thus, the product of this invention has a three-fold advantage: since it is a sugarless gum formulation, there is no danger of subjecting teeth to a sugar environment; additionally, it is a pleasurable substitute for the more deleterious forms of confectionaries; and still further, an effective quantity of dicalcium phosphate dihydrate is released into the oral cavity to combat the untoward effects of other sugar containing foods normally part of the diet.

It is understood that the foregoing detailed description is given merely by way of illustration and that many variations may be made therein without departing from the spirit and scope of this invention.

What is claimed is:

1. In a process for incorporation dicalcium phosphate dihydrate in a sugarless gum composition containing a sorbitol solution as the binding ingredient the improvement comprising incorporating therein from about 10% to about 40% by weight, based on the weight of the total composition, of a polyol agglomerated dicalcium phosphate dihydrate product containing from about 0.5 to about 18 parts by weight of at least one polyol selected from the group consisting of mannitol, sorbitol, xylitol, and arabitol, per part by weight of dicalcium phosphate dihydrate.

2. A process according to claim 1, wherein the polyol agglomerated dicalcium phosphate dihydrate is incorporated in an amount of from about 20% to about 35% by weight, said polyol agglomerated product containing from about 0.5 to about 6.7 parts by weight of polyol per part by weight of dicalcium phosphate dihydrate.

3. A process according to claim 2, wherein the polyol is mannitol.

4. A process according to claim 2, wherein the improvement comprises incorporating about 28% by weight mannitol-agglomerated dicalcium phosphate dihydrate containing about 2.7 parts by weight mannitol per part by weight of dicalcium phosphate dihydrate.

References Cited

UNITED STATES PATENTS

| 3,011,949 | 12/1961 | Bilotti | 99—135 |
| 3,085,048 | 4/1963 | Bush | 424—48 |
| 3,352,689 | 11/1967 | Bilotti | 99—135 |

RICHARD L. HUFF, Primary Examiner

U.S. Cl. X.R.

99—135